(12) United States Patent
Brusberg et al.

(10) Patent No.: US 12,030,809 B2
(45) Date of Patent: Jul. 9, 2024

(54) LOW-LOSS WAVEGUIDES FORMED IN HIGH-TRANSMISSION GLASS USING AG-NA ION EXCHANGE

(71) Applicant: Corning Incorporated, Corning, NY (US)

(72) Inventors: Lars Martin Otfried Brusberg, Corning, NY (US); Davide Domenico Fortusini, Ithaca, NY (US)

(73) Assignee: CORNING INCORPORATED, Corning, NY (US)

( * ) Notice: Subject to any disclaimer, the term of this patent is extended or adjusted under 35 U.S.C. 154(b) by 1000 days.

(21) Appl. No.: 16/930,480

(22) Filed: Jul. 16, 2020

(65) Prior Publication Data

US 2020/0346967 A1    Nov. 5, 2020

Related U.S. Application Data

(63) Continuation of application No. PCT/US2019/013729, filed on Jan. 16, 2019.
(Continued)

(51) Int. Cl.
*C03C 4/00* (2006.01)
*C03C 3/083* (2006.01)
(Continued)

(52) U.S. Cl.
CPC ............ *C03C 4/0092* (2013.01); *C03C 3/083* (2013.01); *C03C 3/085* (2013.01); *C03C 3/087* (2013.01);
(Continued)

(58) Field of Classification Search
None
See application file for complete search history.

(56) References Cited

U.S. PATENT DOCUMENTS

| 3,873,408 A | 3/1975 | Hensler |
| 3,880,630 A | 4/1975 | Tatsuo |

(Continued)

FOREIGN PATENT DOCUMENTS

| CN | 1603869 A | 4/2005 |
| CN | 1844963 A | 10/2006 |

(Continued)

OTHER PUBLICATIONS

Chinese Patent Application No. 201980012659.X, Office Action dated Mar. 7, 2022, 18 pages (09 pages of English Translation and 09 pages of Original document), Chinese Patent Office.
(Continued)

*Primary Examiner* — Jeffrey D Washville
(74) *Attorney, Agent, or Firm* — Tamika A. Crawl-Bey

(57) ABSTRACT

The low-loss ion exchanged (IOX) waveguide disclosed herein includes a glass substrate having a top surface and comprising an alkali-aluminosilicate glass with between 3 and 15 mol % of $Na_2O$ and a concentration of Fe of 20 parts per million (ppm) or less. The glass substrate includes a buried Ag—Na IOX region, wherein this region and a surrounding portion of glass substrate define the IOX waveguide. The IOX waveguide has an optical loss $OL \leq 0.05$ dB/cm and a birefringence magnitude $|B| \leq 0.001$. The glass substrate with multiple IOX waveguides can be used as an optical backplane for systems having optical functionality and can find use in data center and high-performance data transmission applications.

22 Claims, 9 Drawing Sheets

Related U.S. Application Data

(60) Provisional application No. 62/618,866, filed on Jan. 18, 2018.

(51) Int. Cl.

| | | |
|---|---|---|
| *C03C 3/085* | (2006.01) | |
| *C03C 3/087* | (2006.01) | |
| *C03C 3/091* | (2006.01) | |
| *C03C 3/093* | (2006.01) | |
| *C03C 4/18* | (2006.01) | |
| *C03C 21/00* | (2006.01) | |
| *G02B 6/134* | (2006.01) | |

(52) U.S. Cl.
CPC .............. *C03C 3/091* (2013.01); *C03C 3/093* (2013.01); *C03C 4/18* (2013.01); *C03C 21/002* (2013.01); *C03C 21/005* (2013.01); *G02B 6/1345* (2013.01); *C03C 2204/00* (2013.01)

(56) References Cited

U.S. PATENT DOCUMENTS

| | | | |
|---|---|---|---|
| 4,765,702 A * | 8/1988 | Dohan | G02B 6/30 |
| | | | 65/30.13 |
| 5,007,948 A | 4/1991 | Araujo | |
| 5,018,811 A | 5/1991 | Haavisto et al. | |
| 5,035,734 A | 7/1991 | Honkanen et al. | |
| 5,160,523 A | 11/1992 | Honkanen et al. | |
| 5,703,980 A | 12/1997 | Macelwee et al. | |
| 5,790,729 A | 8/1998 | Pologe et al. | |
| 6,002,515 A | 12/1999 | Mizuuchi et al. | |
| 6,153,546 A | 11/2000 | Saitoh et al. | |
| 6,289,027 B1 | 9/2001 | Lawrence et al. | |
| 6,611,372 B1 | 8/2003 | Peyghambarian et al. | |
| 6,768,852 B2 | 7/2004 | Zhang | |
| 6,946,416 B2 | 9/2005 | Maxon et al. | |
| 7,326,500 B1 | 2/2008 | Glebov et al. | |
| 8,230,702 B2 | 7/2012 | Xu et al. | |
| 8,737,777 B2 | 5/2014 | Pitwon | |
| 9,268,096 B1 | 2/2016 | Krasulick et al. | |
| 9,563,018 B2 | 2/2017 | Budd | |
| 2003/0081902 A1 | 5/2003 | Blauvelt et al. | |
| 2003/0095771 A1 | 5/2003 | Kim | |
| 2003/0113054 A1 | 6/2003 | Furuyama | |
| 2003/0118310 A1 | 6/2003 | Steinberg et al. | |
| 2003/0121283 A1 | 7/2003 | Yu | |
| 2003/0144125 A1 | 7/2003 | Anma et al. | |
| 2004/0206129 A1 | 10/2004 | Abby | |
| 2006/0083474 A1 | 4/2006 | Arad et al. | |
| 2006/0260364 A1 | 11/2006 | Pun et al. | |
| 2008/0268201 A1 | 10/2008 | Fiacco et al. | |
| 2009/0324163 A1 | 12/2009 | Dougherty et al. | |
| 2011/0236288 A1 | 9/2011 | Panz et al. | |
| 2011/0244238 A1 | 10/2011 | Panz et al. | |
| 2013/0170802 A1 | 7/2013 | Pitwon | |
| 2013/0322813 A1 | 12/2013 | Grondin et al. | |
| 2014/0079620 A1 | 3/2014 | Panz et al. | |
| 2014/0092377 A1 | 4/2014 | Liu et al. | |
| 2014/0152914 A1 | 6/2014 | King | |
| 2014/0376868 A1 | 12/2014 | Ritter et al. | |
| 2015/0023631 A1 | 1/2015 | Shastri et al. | |
| 2015/0198757 A1 | 7/2015 | Comstock et al. | |
| 2015/0368146 A1 | 12/2015 | Ellison et al. | |
| 2016/0018949 A1 | 1/2016 | Lambricht et al. | |
| 2016/0131837 A1 | 5/2016 | Mahgerefteh et al. | |
| 2017/0205583 A1 | 7/2017 | Bennett et al. | |
| 2018/0067273 A1 | 3/2018 | Geng et al. | |
| 2019/0369244 A1 | 12/2019 | Asghari et al. | |
| 2019/0384003 A1 | 12/2019 | Painchaud et al. | |

FOREIGN PATENT DOCUMENTS

| | | |
|---|---|---|
| CN | 101561534 A | 10/2009 |
| CN | 102109638 A | 6/2011 |
| CN | 102193146 A | 9/2011 |
| CN | 105700075 A | 6/2016 |
| CN | 106291814 A | 1/2017 |
| EP | 0302043 A2 | 2/1989 |
| EP | 0667542 B1 | 6/1998 |
| JP | 61-145511 A | 7/1986 |
| JP | 62-049306 A | 3/1987 |
| JP | 04-086607 A | 3/1992 |
| JP | 2006-201298 A | 8/2006 |
| KR | 10-0439900 B1 | 7/2004 |
| WO | 00/45197 A2 | 8/2000 |
| WO | 00/54197 A2 | 9/2000 |
| WO | 01/37008 A2 | 5/2001 |
| WO | 03/62863 A2 | 7/2003 |
| WO | 2016/055006 A1 | 4/2016 |
| WO | 2017/009468 A1 | 1/2017 |
| WO | 2017/070066 A1 | 4/2017 |

OTHER PUBLICATIONS

Taiwanese Patent Application No. 108101757, Office Action, dated Mar. 15, 2022, 1 page; Taiwanese Patent Office.

Almeida et al; "Waveguides and Nonlinear Index of Refraction of Borate Glass Doped With Transistion Metals"; Optical Materials 42 (2015) pp. 522-525.

Auxier et al; "Silver and Potassium Ion-Exchanged Waveguides in Glasses Doped With PbS Semiconductor Quantum Dots" ; J. Opt. Soc. Am. B, vol. 23, No. 6, (2006) pp. 1037-1045.

Betschon et al; "Design Principles and Realization of Electro-Optical Circuit Boards," SPIE 8630 (2013); pp. 86300U-1-86300U-12.

Brusberg et al; "High Performance Ion-Exchanged Integrated Waveguides in Thin Glass for Board-Level Multimode; Optical Interconnects" ; Proc ECOC (2015); 3 Pages.

Cheng et al., "Simulation of tapered transitions in ion-exchanged channel waveguides", Applied Optics, vol. 29, No. 8, Mar. 10, 1990.

Furukawa et al; "Optical Damage Resistance and Crystal Quality of LiNbO3 Single Crystals With Various [Li]/[Nb] Ratios" ; Journal of Applied Physics, 72, (8); (1992) pp. 3250-3254.

Hao et al; "Single-Mode-Fiber-Matched Waveguide by Silver/Sodium Ion-Exchange and Field-Assisted Ion-Diffusion" ; Optoelectronics and Advanced Materials—Rapid Communications; vol. 3; No. 9; (2009) pp. 865-868.

Hayden et al; "Active Materials for Integrated Optic Applications"; SPIE vol. 3847 (1999) pp. 186-196.

Ingenhoff et al; "Minimizing Losses in Silver Ion-Exchanged Waveguides Using a Double Ion Exchange Process" ; SPIE vol. 2401; (1995) 10 Pages.

International Search Report and Written Opinion of the International Searching Authority; PCT/US2019/013729; dated Apr. 29, 2019; 13 Pages; European Patent Office.

Ishigure; "Gi-Core Polymer Optical Waveguide for Triggering the Migration of Optical Interconnects From Inter-Rack to PCBs" Proc. ECOC; Tu.3.5.5, (2014); 3 Pages.

Julich et al; "Determination of the Effective Refractive Index of Various Single Mode Fibers for Fibre Bragg Grating Sensor Applications" ; Sensor+Test Conference 2009, Opto 2009 Proceedings pp. 119-124 (2009.

Kash et al; "Optical Interconnects in Exascale Supercomputers" ; IEEE Photonics Society; (2010) pp. 483-484.

Keck et al; "Spectral Response of Low-Loss Optical Waveguides"; Applied Optics; vol. 11, No. 7; (1972) pp. 1502-1506.

Madasamy et al; "Buried Ion-Exchanged Glass Waveguides: Burial-Depth Dependence on Waveguide Width" ; Optics Letters; vol. 28, No. 13, (2003) pp. 1132-1134.

Marcuse; "Influence of Curvature on the Losses of Doubly CLAD Fibers". Applied Optics / vol. 21, No. 23 / Dec. 1, 1982.

Mashayekhi et al. "Semiconductor device to optical fiber coupling using low-loss glasstaper waveguide" , Optical Engineering, Soc. of Photo-optical Instrumentation Engineers 36(12) 1997.

Matoba et al; "Nonuniform and Off-Axis Structures for Photorefractive Waveguides in Lithium Niobate" ; Opt. Eng. 35(8); (1996) pp. 2175-2181.

(56) References Cited

OTHER PUBLICATIONS

Meany et al; "Towards Low-Loss Lightwave Circuits for Non-Classical Optics at 800 nm and 1550 nm" ; Applied Physics A, vol. 114; Issue 1; (2014) pp. 113-118.

Nakai et al; "Reduction of Absorption Loss Due to Iron Ions in Fluoride Glasses" ; Electronic Letters, vol. 21, No. 14 (1985) pp. 625-626.

Olivares et al; "Fe Ions in Proton-Exchanged LiNbO3 Waveguides"; Appl. Phys. Lett. 61, (6); (1992) pp. 624-626.

Oven; "Tapered Waveguides Produced by Ion Exchange in Glass With a Nonuniform Electric Field" ; Journal of Lightwave Technology; vol. 24, No. 11, Nov. 2006; pp. 4337-4344.

Penty et al; "Low Loss Ends for On-Board Polymer Interconnects" PhoxTroT Symposium, Berlin (2014); 25 Pages.

Pitwon et al; "Pluggable Electro-Optical Circuit Board Interconnect Based on Embedded Graded-Index Planar Glass Waveguides" ; Journal of Lightwave Technology, vol. 33, No. 4, (2015); pp. 741-754.

Poulopoulos et al; "SiN-Assisted Flip-Chip Adiabatic Coupler Between SiPh and Glass OPCBS"; Proceedings of SPIE; 9753; Mar. 2016; pp. 975310-1-975310-10.

Ramaswamy et al; "Ion-Exchanged Glass Waveguides: A Review"; Journal of Lightwave Technology, vol. 6., No. 6., Jun. 1988; pp. 984-1002.

Ramponi et al; "New Er-Doped Phosphate Glass for Ion-Exchange Active Waveguides: Accurate Determination of the Refractive Index"; Optical Materials, 14 (2000) pp. 291-296.

Rehouma et al; "Glasses for Ion-Exchange Technology" ; International Journal of Communications; Issue 4, vol. 1, (2008); pp. 148-155.

Rogozinski; "Ion Exchange in Glass—The Changes of Glass Refraction" ; Intech Chapter 7; (2012); pp. 155-190.

Sheridan et al; "Channel Waveguides in Ion-Exchanged Pyrex by Direct UV Writing" ; Optics Communications, 242 (2004) pp. 109-114.

Stewart et al; "Planar Optical Waveguides Formed by Silver-Ion Migration in Glass" ; IEEE Journal of Quantum Electronics, vol. QE-13, No. 4; (1977); pp. 192-200.

Tanio et al; "What Is the Most Transparent Polymer?" Polymer Journal, vol. 32, No. 1 pp. 43-50 (2000).

Tervonen et al; "Ion-Exchanged Glass Waveguides Technology: A Review" ; Optical Engineering, 50 (7); (2011) pp. 071107-1-071107-15.

Tick; "Are Low-Loss Glass-Ceramic Optical Waveguides Possible?" ; Optics Letters; vol. 23, No. 24, (1998) pp. 1904-1905.

Wartak; "Simulation and Modeling: Computational Photonics Models Wavefuide-Based Optics," Laser Focus World, vol. 52, Issue 02, Feb. 2016.

Yliniemi et al; "Ion-Exchanged Glass Waveguides With Low Birefringence for a Broad Range of Waveguide Widths" ; Applied Optics; vol. 44, No. 16 (2005) pp. 3358-3363.

Zhang et al; "Modes Effective Refractive Index Difference Measurement in Few Mode Optical Fiber" ; Procedia Engineering; 140; (2016); pp. 77-84.

Zhang et al; "Photo-Written Three-Dimensional Optical Circuits in Iron Doped Lithium Niobate Crystals" , Proc. of SPIE 6149, 2nd Internaitonal Symposium on Advanced Optical Manufacturing and Testing Technologies: Advanced Optical Manufacturing Technologies; (2006) 9 Pages.

Japanese Patent Application No. 2020-539280, Office Action, dated Aug. 24, 2022, 14 pages (7 pages of English Translation and 7 pages of Original Copy); Japanese Patent Office.

\* cited by examiner

LOW-LOSS WAVEGUIDES FORMED IN HIGH-TRANSMISSION GLASS USING AG-NA ION EXCHANGE

CROSS-REFERENCE TO RELATED APPLICATION

This application is a continuation of International Application No. PCT/US19/13729, filed on Jan. 16, 2019, which claims the benefit of priority to U.S. Application No. 62/618,866, filed on Jan. 18, 2018, both applications being incorporated herein by reference.

FIELD

The present disclosure relates to waveguides formed by an ion exchange (IOX) process, and in particular relates to low-loss waveguides formed in high-transmission glass using an Ag—Na IOX process.

BACKGROUND

Optical waveguides are finding increasing use in forming optical links with silicon photonic printed circuit boards (PCBs) that support optical transceiver modules. In some cases, the optical waveguides are integrated in the silicon photonic PCBs and are optically connected to optical fibers. In other longer-distance applications (e.g., up to about 2 meters) optical waveguides are used to define an optical backplane used to provide high-speed optical interconnections either between chips on a circuit board, between circuit boards or between optical-electronic (O-E) devices within an electronics rack or between electronics racks.

The increasing demands on the performance of silicon photonics systems has in turn placed increasing demands on the performance of optical waveguides used in such systems. One of these demands is low-loss transmission of optical signals (e.g., 0.05 dB/cm or less), especially for the case of relatively long optical transmissions such as are associated with optical backplanes. Other demands include that the IOX waveguides be thermally stable, have zero or very low birefringence, and that the substrate in which the waveguides are formed be mechanically stable and have a coefficient of thermal expansion (CTE) that is close to if not the same as that of the other materials used in the silicon photonic system.

SUMMARY

An embodiment of the disclosure is a method of forming an IOX waveguide in a substrate. The method comprises: a) forming a mask on a top surface of the substrate, the mask defining at least one opening to the top surface, wherein the substrate comprises an alkali-aluminosilicate glass including Na and including Fe at a concentration equal to or less than 50 parts per million; b) performing a first IOX process through the top surface of the substrate within the at least one opening to define within the substrate an initial IOX region having a maximum refractive index at the top surface of the substrate; and c) performing a second IOX process at the top surface of the substrate to form from the initial IOX region a buried IOX region having a maximum refractive index below the top surface of the substrate, the buried IOX region defining an IOX waveguide having an optical loss OL≤0.05 dB/cm and a magnitude of birefringence |B|≤0.001, wherein the second IOX process is an Na—Ag IOX process.

Another embodiment of the disclosure is a low-loss IOX waveguide, comprising: a glass substrate having a top surface and comprising an alkali-aluminosilicate glass that comprises between 3 and 15 mol % of $Na_2O$ and that has a concentration of Fe of 20 parts per million or less; and a buried Ag—Na IOX region formed in the glass substrate, the buried Ag—Na IOX region having a maximum refractive index below the top surface of the glass substrate, wherein the buried Ag—Na IOX region and a surrounding portion of the glass substrate define an Ag—Na IOX waveguide having an optical loss OL≤0.05 dB/cm and a birefringence magnitude |B|≤0.001.

Another embodiment of the disclosure is a backplane for a system, such as an optical or optical-electrical system, that carries optical signals. The backplane comprises: a glass substrate having a top surface, the glass substrate comprising an alkali-aluminosilicate glass that comprises between 3 and 15 mol % of $Na_2O$ and that has a concentration of Fe of 20 parts per million or less; a buried Ag—Na IOX region formed in the glass substrate, wherein the buried Ag—Na IOX region has a maximum refractive index below the top surface of the glass substrate, the buried Ag—Na IOX region and a surrounding portion of the glass substrate defining an Ag—Na IOX waveguide that supports at least one propagating waveguide mode in a wavelength range between 800 nm and 1600 nm having an optical loss OL≤0.01 dB/cm and a birefringence magnitude |B|≤0.001 in the wavelength range; and an optical coupler configured to couple optical signals into and out of the Ag—Na IOX waveguide.

Additional features and advantages are set forth in the Detailed Description that follows, and in part will be apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description explain the principles and operation of the various embodiments. As such, the disclosure will become more fully understood from the following Detailed Description, taken in conjunction with the accompanying Figures, in which.

DETAILED DESCRIPTION

Figure 1:
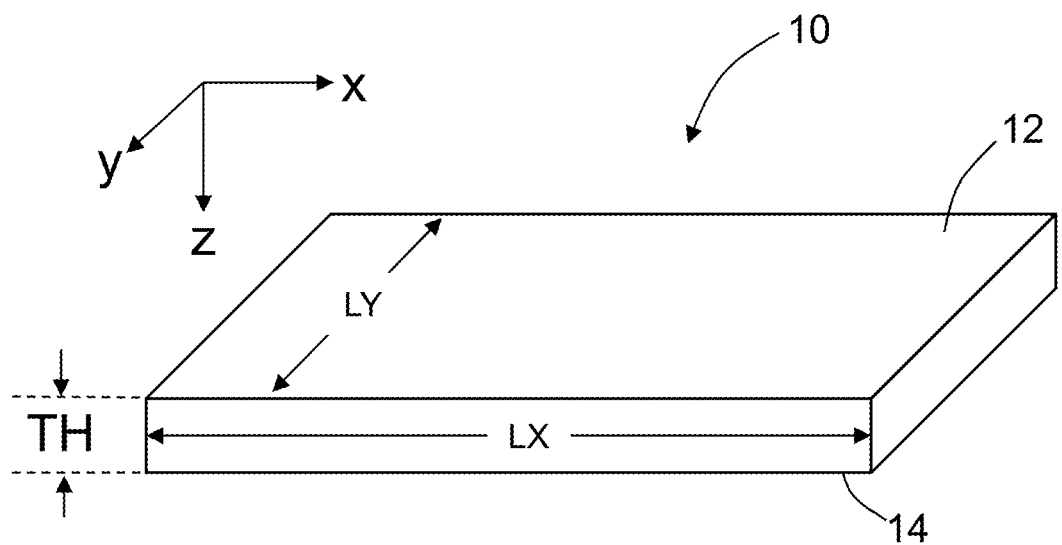
FIG. 1 is a top elevated view of an example glass substrate.

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute part of this detailed description.

Cartesian coordinates are shown in some of the Figures for the sake of reference and are not intended to be limiting as to direction or orientation.

The abbreviation "ppm" as used herein stands for "parts per million."

The abbreviation "μm" stands for micron, which is $1 \times 10^{-6}$ meter, and is also called a micrometer.

The symbol "≈" means "approximately equal to."

The acronym "IOX" as used herein can mean either "ion exchange" or "ion exchanged," depending on the syntax.

The abbreviation "O-E" stands for "optical-electrical" and is used to describe a device or system that has both optical and electrical functionality.

The term "mode" is short for "guided mode" or "waveguide mode," which describes an allowed spatial distribution of light that propagates in a waveguide. A mode can have a transverse electric (TE) polarization or a transverse magnetic (TM) polarization. A single mode waveguide supports only one TE and one TM mode.

The birefringence $B=nT_E-n_{TM}$, where $n_{TE}$ is the refractive index measured for the TE polarization and $n_{TM}$ is the refractive index measured for the TM polarization. Systems and methods for measuring the birefringence and related properties (e.g., stress, depth of layer, etc.) of IOX glass are known in the art. An example system is the FSM-60LE surface stress meter manufactured by Luceo Co., Ltd. (Tokyo, Japan). Example methods are disclosed in U.S. Patent Application Publication No. 2014/0092377, entitled "Systems and methods for measuring birefringence in glass and glass ceramics," which is incorporated by reference herein.

The magnitude of the birefringence B is given by $|B|=|n_{TE}-n_{TM}|$, and is taken to the maximum value within a given IOX region unless stated otherwise.

The abbreviation "nm" stands for "nanometer," which is $1 \times 10^{-9}$ meter.

The abbreviation "AAS" stands for "alkali-aluminosilicate" and is used to describe a type of glass.

The "depth of layer" is denoted DL and is the depth of the IOX region formed in a substrate as measured from the top surface of the substrate to the point within the substrate where the refractive index of the IOX region reach the bulk index of the substrate.

The term "comprises" as used herein, such as in the phrase "A comprises B," is intended to include as a special case "A consists of B."

The term "high-transmission" or "high transmittance" with respect to a glass substrate or glass material means that the glass substrate or glass material has an internal transmittance in the wavelength range between 800 nm and 1600 nm of at least 98.86% for a thickness of 1 cm or at least 99.95% for a thickness of 1 cm. The glass substrate or glass material can also be referred to as being "low-loss," meaning an optical loss of 0.05 dB/cm or less, or 0.002 dB/cm or less in the wavelength range between 800 nm and 1600 nm.

Glass Substrate

FIG. 1 is a top elevated view of an example glass substrate 10 as used herein to form the low-loss waveguides according to the disclosure. The glass substrate 10 is shown in the form of a sheet having a top surface 12 and a bottom surface 14. In examples, the substrate may be formed by a polished float glass process, a fusion draw process, a slot draw process, a redraw process, or another suitable forming process. The glass substrate 10 has a bulk refractive index $n_0$. Example lengths LX in the x-direction can be relatively long, e.g., 0.1 meter (m) or more in backplane applications such as discussed below. Example thicknesses TH in the z-direction can be in the range from 0.3 millimeter (mm) to 5 mm.

The glass substrate 10 has certain properties that enable the formation of low-loss waveguides using an IOX process, as described below. In an example, the glass substrate 10 has the following properties: 1) the glass material of the glass substrate 10 is high transmission; 2) a suitable monovalent ion such as sodium (Nat) present in a sufficient amount so that the glass is amenable to IOX waveguide fabrication; 3) no contaminants or alternatively relatively low amounts of contaminants, such as Fe, Cr and Ni, so that the glass has a reduced propensity to form silver clusters during or after the Ag—Na IOX process, which is described below; 4) an IOX diffusivity D (m$^2$/s) that is sufficiently low for temperatures up to 100° C. so that the IOX waveguides retain their refractive index profiles and loss characteristics over a wide range of possible environmental condition; 5) a relatively low residual stress after the IOX process is carried out so that resulting final IOX region has a birefringence B that is either absent or minimal, e.g., a birefringence magnitude |B|≤0.001 for optimal coupling efficiency to standard unpolarized optical glass fibers such as Corning® SMF-28®; 6) the glass substrate is formable using a fusion draw process to obtain excellent surface quality; and 7) the glass material is formable into thin sheets (e.g., 50 microns) using roll-to-roll processing for high throughput and automated processing.

An example glass type that has the above properties is an alkali-aluminosilicate (AAS) glass for which in various examples the concentration of iron (Fe) is 20 ppm or less, or 15 ppm or less, or 10 ppm or less, or 5 ppm or less, while the concentration of other impurities such as Ni and Cr is 5 ppm or less, or 2 ppm or less. In various embodiments, the AAS glass comprises 1 ppm or less of Co, Ni, and Cr, or alternatively 1 ppm or less of Co, Ni, and Cr. Such glasses can be referred to as low-iron AAS glasses.

It has been found that a high transmittance AAS glass can be obtained when Fe+30Cr+35Ni<60 ppm. In some embodiments, the concentration of Fe can be <about 50 ppm, <about 40 ppm, <about 30 ppm, <about 20 ppm, or <about 10 ppm. In other embodiments, Fe+30Cr+35Ni<about 50 ppm, <about 40 ppm, <about 30 ppm, <about 20 ppm, or <about 10 ppm. In an example, when the Fe concentration >about 50 ppm, the concentration of Cr is reduced to 0.1 wt % or less.

Example AAS glasses suitable for use as glass substrate 10 is a Corning Iris™ glass, made by Corning, Inc., Corning, New York There are two types of Corning Iris™ glass that can have low-iron compositions and that are particularly suitable for forming the IOX waveguides disclosed herein, and they are referred to hereinafter as "AAS-1" and "AAS-2." Example compositions of the AAS-1 and AAS-2 glasses are set forth below, wherein the glass compositions are subject to the above-described limitations on the concentrations of Fe, Ni and Cr.

Example Compositions of AAS-1 Glass

In one example, the AAS-1 glass comprises between about 70 mol % to about 85 mol % $SiO_2$, between about 0 mol % to about 5 mol % $Al_2O_3$, between about 0 mol % to about 5 mol % $B_2O_3$, between about 3 mol % to about 10 mol % $Na_2O$, between about 0 mol % to about 12 mol % $K_2O$, between about 0 mol % to about 4 mol % ZnO, between about 3 mol % to about 12 mol % MgO, between about 0 mol % to about 5 mol % CaO, between about 0 mol % to about 3 mol % SrO, between about 0 mol % to about 3 mol % BaO, and between about 0.01 mol % to about 0.5 mol % $SnO_2$.

In some examples, the AAS-1 glass can comprise a glass sheet with a front face having a width and a height, a back face opposite the front face, and a thickness between the front face and back face forming four edges around the front and back faces, wherein the glass sheet comprises between about 72.82 mol % to about 82.03 mol % $SiO_2$, between about 0 mol % to about 4.8 mol % $Al_2O_3$, between about 0 mol % to about 2.77 mol % $B_2O_3$, between about 3 mol % to about 9.28 mol % $Na_2O$, between about 0.58 mol % to about 10.58 mol % $K_2O$, between about 0 mol % to about 2.93 mol % ZnO, between about 3.1 mol % to about 10.58 mol % MgO, between about 0 mol % to about 4.82 mol % CaO, between about 0 mol % to about 1.59 mol % SrO, between about 0 mol % to about 3 mol % BaO, and between about 0.08 mol % to about 0.15 mol % $SnO_2$. In further examples, the glass sheet is substantially free of $Al_2O_3$, $B_2O_3$, $Na_2O$, CaO, SrO, or BaO, and combinations thereof.

Example Compositions of AAS-2 Glass

The AAS-2 glass can comprise between about 65.79 mol % to about 78.17 mol % $SiO_2$, between about 2.94 mol % to about 12.12 mol % $Al_2O_3$, between about 0 mol % to about 11.16 mol % $B_2O_3$, between about 0 mol % to about 2.06 mol % $Li_2O$, between about 3.52 mol % to about 13.25 mol % $Na_2O$, between about 0 mol % to about 4.83 mol % $K_2O$, between about 0 mol % to about 3.01 mol % ZnO, between about 0 mol % to about 8.72 mol % MgO, between about 0 mol % to about 4.24 mol % CaO, between about 0 mol % to about 6.17 mol % SrO, between about 0 mol % to about 4.3 mol % BaO, and between about 0.07 mol % to about 0.11 mol % $SnO_2$.

In some examples, the AAS-2 glass comprises an $R_xO/Al_2O_3$ between 0.95 and 3.23, wherein R is any one or more of Li, Na, K, Rb, Cs and x is 2. In some examples, the glass article comprises an $R_xO/Al_2O_3$ between 1.18 and 5.68, wherein R is any one or more of Li, Na, K, Rb, Cs and x is 2, or Zn, Mg, Ca, Sr or Ba and x is 1. In some examples, the glass article comprises an $R_xO—Al_2O_3—MgO$ between −4.25 and 4.0, wherein R is any one or more of Li, Na, K, Rb, Cs and x is 2. In some examples, the glass has a strain temperature between about 522° C. and 590° C. In some examples, the glass has an annealing temperature between about 566° C. and 641° C. In some examples, the glass has a softening temperature between about 800° C. and 914° C. In some examples, the glass has a CTE between about 49.6×10-7/° C. to about 80×10-7/° C. In some examples, the glass has a density between about 2.34 gm/cc @ 20 C and about 2.53 gm/cc @ 20 C.

In further examples, the AAS-2 glass comprises from about 0.1 mol % to about 3.0 mol % ZnO, from about 0.1 mol % to about 1.0 mol % $TiO_2$, from about 0.1 mol % to about 1.0 mol % $V_2O_3$, from about 0.1 mol % to about 1.0 mol % $Nb_2O_5$, from about 0.1 mol % to about 1.0 mol % MnO, from about 0.1 mol % to about 1.0 mol % $ZrO_2$, from about 0.1 mol % to about 1.0 mol % $As_2O_3$, from about 0.1 mol % to about 1.0 mol % $SnO_2$, from about 0.1 mol % to about 1.0 mol % $MoO_3$, from about 0.1 mol % to about 1.0 mol % $Sb_2O_3$, or from about 0.1 mol % to about 1.0 mol % $CeO_2$. In additional examples, the glass comprises between 0.1 mol % to no more than about 3.0 mol % of one or combination of any of ZnO, $TiO_2$, $V_2O_3$, $Nb_2O_5$, MnO, $ZrO_2$, $As_2O_3$, $SnO_2$, $MoO_3$, $Sb_2O_3$, and $CeO_2$.

In further examples, the AAS-2 glass comprises between about 66 mol % to about 78 mol % $SiO_2$, between about 4 mol % to about 11 mol % $Al_2O_3$, between about 4 mol % to about 11 mol % $B_2O_3$, between about 0 mol % to about 2 mol % $Li_2O$, between about 4 mol % to about 12 mol % $Na_2O$, between about 0 mol % to about 2 mol % $K_2O$, between about 0 mol % to about 2 mol % ZnO, between about 0 mol % to about 5 mol % MgO, between about 0 mol % to about 2 mol % CaO, between about 0 mol % to about 5 mol % SrO, between about 0 mol % to about 2 mol % BaO, and between about 0 mol % to about 2 mol % $SnO_2$. In some examples, the glass article comprises a color shift <0.008.

In some examples, the AAS-2 glass comprises an $R_xO/Al_2O_3$ between 0.95 and 3.23, wherein R is any one or more of Li, Na, K, Rb, Cs and x is 2. In some examples, the glass article comprises an $R_xO/Al_2O_3$ between 1.18 and 5.68, wherein R is any one or more of Li, Na, K, Rb, Cs and x is 2, or Zn, Mg, Ca, Sr or Ba and x is 1. In some examples, the glass article comprises an $R_xO—Al_2O_3—MgO$ between −4.25 and 4.0, wherein R is any one or more of Li, Na, K, Rb, Cs and x is 2. In some examples, the glass has a strain temperature between about 522° C. and 590° C. In some examples, the glass has an annealing temperature between about 566° C. and 641° C. In some examples, the glass has a softening temperature between about 800° C. and 914° C. In some examples, the glass has a CTE between about 49.6×10-7/° C. to about 80×10-7/° C. In some examples, the glass has a density between about 2.34 gm/cc @ 20 C and about 2.53 gm/cc @ 20 C.

In further examples, the AAS-2 glass comprises from about 0.1 mol % to about 3.0 mol % ZnO, from about 0.1 mol % to about 1.0 mol % $TiO_2$, from about 0.1 mol % to about 1.0 mol % $V_2O_3$, from about 0.1 mol % to about 1.0 mol % $Nb_2O_5$, from about 0.1 mol % to about 1.0 mol % MnO, from about 0.1 mol % to about 1.0 mol % $ZrO_2$, from about 0.1 mol % to about 1.0 mol % $As_2O_3$, from about 0.1 mol % to about 1.0 mol % $SnO_2$, from about 0.1 mol % to about 1.0 mol % $MoO_3$, from about 0.1 mol % to about 1.0 mol % $Sb_2O_3$, or from about 0.1 mol % to about 1.0 mol % $CeO_2$. In additional examples, the glass comprises between 0.1 mol % to no more than about 3.0 mol % of one or combination of any of ZnO, $TiO_2$, $V_2O_3$, $Nb_2O_5$, MnO, $ZrO_2$, $As_2O_3$, $SnO_2$, $MoO_3$, $Sb_2O_3$, and $CeO_2$.

In additional examples, the AAS-2 glass comprises: between about 72 mol % to about 80 mol % $SiO_2$, between about 3 mol % to about 7 mol % $Al_2O_3$, between about 0 mol % to about 2 mol % $B_2O_3$, between about 0 mol % to about 2 mol % $Li_2O$, between about 6 mol % to about 15 mol % $Na_2O$, between about 0 mol % to about 2 mol % $K_2O$, between about 0 mol % to about 2 mol % ZnO, between about 2 mol % to about 10 mol % MgO, between about 0 mol % to about 2 mol % CaO, between about 0 mol % to about 2 mol % SrO, between about 0 mol % to about 2 mol % BaO, and between about 0 mol % to about 2 mol % $SnO_2$.

In some examples, the glass article comprises an $R_xO/Al_2O_3$ between 0.95 and 3.23, wherein R is any one or more of Li, Na, K, Rb, Cs and x is 2. In some examples, the glass article comprises an $R_xO/Al_2O_3$ between 1.18 and 5.68, wherein R is any one or more of Li, Na, K, Rb, Cs and x is 2, or Zn, Mg, Ca, Sr or Ba and x is 1. In some examples, the glass article comprises an $R_xO—Al_2O_3—MgO$ between −4.25 and 4.0, wherein R is any one or more of Li, Na, K, Rb, Cs and x is 2. In some examples, the glass has a strain temperature between about 522° C. and 590° C. In some examples, the glass has an annealing temperature between about 566° C. and 641° C. In some examples, the glass has a softening temperature between about 800° C. and 914° C. In some examples, the glass has a CTE between about $49.6 \times 10^{-7}/°$ C. to about $80 \times 10^{-7}/°$ C. In some examples, the glass has a density between about 2.34 gm/cc @ 20 C and about 2.53 gm/cc @ 20 C. In further examples, the AAS-2 glass comprises from about 0.1 mol % to about 3.0 mol % ZnO, from about 0.1 mol % to about 1.0 mol % $TiO_2$, from about 0.1 mol % to about 1.0 mol % $V_2O_3$, from about 0.1 mol % to about 1.0 mol % $Nb_2O_5$, from about 0.1 mol % to about 1.0 mol % MnO, from about 0.1 mol % to about 1.0 mol % $ZrO_2$, from about 0.1 mol % to about 1.0 mol % $As_2O_3$, from about 0.1 mol % to about 1.0 mol % $SnO_2$, from about 0.1 mol % to about 1.0 mol % $MoO_3$, from about 0.1 mol % to about 1.0 mol % $Sb_2O_3$, or from about 0.1 mol % to about 1.0 mol % $CeO_2$. In additional examples, the glass comprises between 0.1 mol % to no more than about 3.0 mol % of one or combination of any of ZnO, $TiO_2$, $V_2O_3$, $Nb_2O_5$, MnO, $ZrO_2$, $As_2O_3$, $SnO_2$, $MoO_3$, $Sb_2O_3$, and $CeO_2$.

In yet further examples, the AAS-2 glass comprises between about 60 mol % to about 80 mol % $SiO_2$, between about 0 mol % to about 15 mol % $Al_2O_3$, between about 0 mol % to about 15 mol % $B_2O_3$, and about 2 mol % to about 50 mol % $R_xO$, wherein R is any one or more of Li, Na, K, Rb, Cs and x is 2, or Zn, Mg, Ca, Sr or Ba and x is 1, and wherein the glass has a color shift <0.008. In some examples, the glass has a color shift <0.005. In further examples, the glass comprises from about 0.1 mol % to about 3.0 mol % ZnO, from about 0.1 mol % to about 1.0 mol % $TiO_2$, from about 0.1 mol % to about 1.0 mol % $V_2O_3$, from about 0.1 mol % to about 1.0 mol % $Nb_2O_5$, from about 0.1 mol % to about 1.0 mol % MnO, from about 0.1 mol % to about 1.0 mol % $ZrO_2$, from about 0.1 mol % to about 1.0 mol % $As_2O_3$, from about 0.1 mol % to about 1.0 mol % $SnO_2$, from about 0.1 mol % to about 1.0 mol % $MoO_3$, from about 0.1 mol % to about 1.0 mol % $Sb_2O_3$, or from about 0.1 mol % to about 1.0 mol % $CeO_2$. In additional examples, the AAS-2 glass comprises between 0.1 mol % to no more than about 3.0 mol % of one or combination of any of ZnO, $TiO_2$, $V_2O_3$, $Nb_2O_5$, MnO, $ZrO_2$, $As_2O_3$, $SnO_2$, $MoO_3$, $Sb_2O_3$, and $CeO_2$.

In other examples, the AAS-2 glass comprises between about 65.79 mol % to about 78.17 mol % $SiO_2$, between about 2.94 mol % to about 12.12 mol % $Al_2O_3$, between about 0 mol % to about 11.16 mol % $B_2O_3$, and about 3.52 mol % to about 42.39 mol % $R_xO$, wherein R is any one or more of Li, Na, K, Rb, Cs and x is 2, or Zn, Mg, Ca, Sr or Ba and x is 1, and wherein the glass has a color shift <0.008. In some examples, the glass has a color shift <0.005. In further examples, the glass comprises from about 0.1 mol % to about 3.0 mol % ZnO, from about 0.1 mol % to about 1.0 mol % $TiO_2$, from about 0.1 mol % to about 1.0 mol % $V_2O_3$, from about 0.1 mol % to about 1.0 mol % $Nb_2O_5$, from about 0.1 mol % to about 1.0 mol % MnO, from about 0.1 mol % to about 1.0 mol % $ZrO_2$, from about 0.1 mol % to about 1.0 mol % $As_2O_3$, from about 0.1 mol % to about 1.0 mol % $SnO_2$, from about 0.1 mol % to about 1.0 mol % $MoO_3$, from about 0.1 mol % to about 1.0 mol % $Sb_2O_3$, or from about 0.1 mol % to about 1.0 mol % $CeO_2$. In additional examples, the glass comprises between 0.1 mol % to no more than about 3.0 mol % of one or combination of any of ZnO, $TiO_2$, $V_2O_3$, $Nb_2O_5$, MnO, $ZrO_2$, $As_2O_3$, $SnO_2$, $MoO_3$, $Sb_2O_3$, and $CeO_2$.

In additional examples, the AAS-2 glass comprises between about 60 mol % to about 81 mol % $SiO_2$, between about 0 mol % to about 2 mol % $Al_2O_3$, between about 0 mol % to about 15 mol % MgO, between about 0 mol % to about 2 mol % $Li_2O$, between about 9 mol % to about 15 mol % $Na_2O$, between about 0 mol % to about 1.5 mol % $K_2O$, between about 7 mol % to about 14 mol % CaO, and between about 0 mol % to about 2 mol % SrO, wherein the glass has a color shift <0.008. In some examples, the glass has a color shift <0.005. In further examples, the glass comprises from about 0.1 mol % to about 3.0 mol % ZnO, from about 0.1 mol % to about 1.0 mol % $TiO_2$, from about 0.1 mol % to about 1.0 mol % $V_2O_3$, from about 0.1 mol % to about 1.0 mol % $Nb_2O_5$, from about 0.1 mol % to about 1.0 mol % MnO, from about 0.1 mol % to about 1.0 mol % $ZrO_2$, from about 0.1 mol % to about 1.0 mol % $As_2O_3$, from about 0.1 mol % to about 1.0 mol % $SnO_2$, from about 0.1 mol % to about 1.0 mol % $MoO_3$, from about 0.1 mol % to about 1.0 mol % $Sb_2O_3$, or from about 0.1 mol % to about 1.0 mol % $CeO_2$. In additional examples, the glass comprises between 0.1 mol % to no more than about 3.0 mol % of one or combination of any of ZnO, $TiO_2$, $V_2O_3$, $Nb_2O_5$, MnO, $ZrO_2$, $As_2O_3$, $SnO_2$, $MoO_3$, $Sb_2O_3$, and $CeO_2$.

The Ag—Na IOX Process for Forming IOX Waveguides

Experiments carried out on various example low-iron AAS glass substrates 10 indicate that the best performing IOX waveguides result when silver ($Ag^+$) ions are exchanged with sodium ($Na^+$) ions. These waveguides are referred to below as Ag—Na IOX waveguides. Because of the relatively small radius of the $Ag^+$ ion, the compressive stress resulting from the IOX process, which gives rise to birefringence, is less than that for other ions used in IOX processes, such as $K^+$ ions.

Measurements on Ag—Na IOX waveguides formed in the example AAS-1 and AAS-2 glasses indicate that the magnitude of the birefringence |B| at the waveguide surface for Ag—Na IOX waveguides is |B|<0.001, as compared to greater than 0.002 for waveguides formed using a K—Na IOX process in the same glass. Such a small amount for the birefringence magnitude |B| is important for IOX waveguides when forming optical interconnects to reduce the polarization dependent coupling loss.

Likewise, measurements of the compressive stress in AAS-1 and AAS-2 glasses indicated that the Ag—Na IOX process generates 5× less compressive stress than the K—Na IOX process in the same glass. Suitable depths of layer DL of up to 80 μm for multimode transmission and up to 15 μm for single mode transmission can also be obtained in the AAS-1 and AAS-2 glasses using the Ag—Na IOX process.

Ag—Na IOX Waveguide Fabrication

FIGS. 2A through 2E are cross-sectional views of the example glass substrate 10 of FIG. 1 that show an example method of forming the low-loss Ag—Na IOX waveguides as disclosed herein. In examples, the glass substrate 10 comprises either AAS-1 or AAS-2 glass.

Figure 2A:
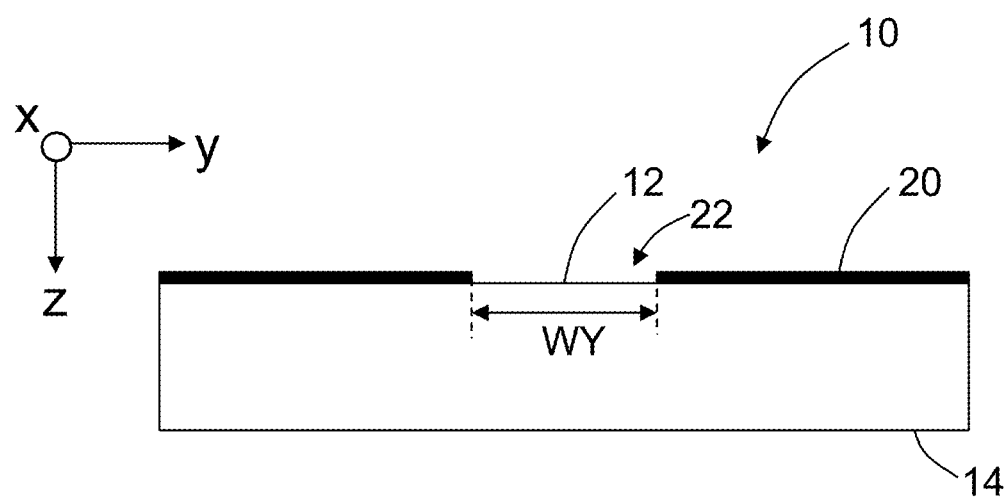
FIGS. 2A through 2E are cross-sectional views of the example glass substrate of FIG. 1 that show an example method of forming the Ag—Na IOX waveguides as disclosed herein.

FIG. 2A shows the glass substrate 10 having a mask 20 on the top surface 12. The mask 20 includes an aperture 22 that is open to the top surface 12. The mask 20 can be formed from a material that does not substantially diffuse into the glass substrate 10. Example materials include aluminum, titanium and silicon dioxide. In an example, the aperture 22 can extend in the y-direction to define an elongate opening, e.g., a slot opening. In some embodiments, the aperture 22 has a width WY of between 1 μm and 10 μm for forming single mode Ag—Na IOX waveguides, and a width WY of between 10 μm and 50 μm for forming multimode Ag—Na IOX waveguides.

In an example, the glass substrate 10 can include alignment features (not shown), such as markers or fiducials, that can be added during the mask-forming process and that remain in place after the IOX process and mask removal is completed. Such alignment features can have a very high position accuracy and be formed to have excellent visibility for visual alignment (including machine-vision alignment) of additional components.

Figure 2B:
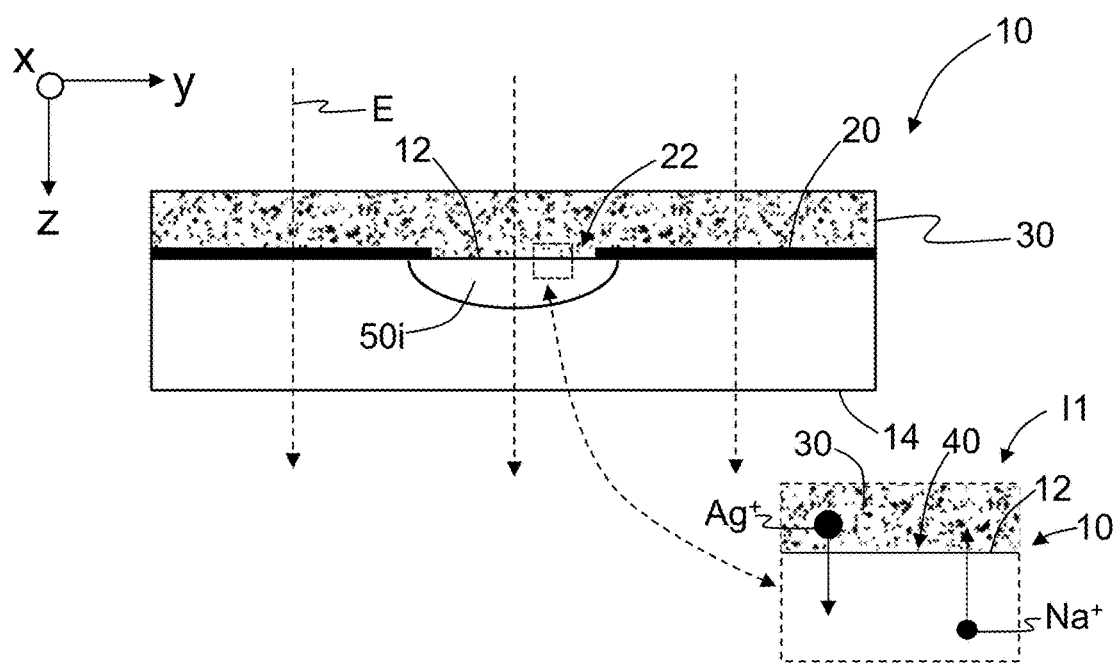

FIG. 2B is similar to FIG. 2A and shows a silver salt bath 30 atop the glass substrate and covering the mask 20 and the exposed upper surface 12 at the aperture 22 as part of a first or "step 1" diffusion. In some embodiments, the silver salt bath 30 comprises $AgNO_3$. Example IOX parameters for the Ag—Na IOX process can include a diffusion temperature $T_D$ in the range from 250° C. to 400° C., a silver concentration $C_{Ag}$ in the range from 1 wt % to 25 wt %, and a diffusion time $t_D$ in the range from 10 minutes (min) to 200 hours (h). In some embodiments, an optional electrical field E can be used to make the IOX process field assisted, as is known in the art.

The step 1 diffusion involves an Ag—Na IOX process wherein $Ag^+$ ions in the silver salt bath 30 and thus external to the glass are exchanged for $Na^+$ ions internal to the glass and that are part of glass matrix that makes up the glass substrate 10, as illustrated in the close-up inset 11 of FIG. 2B that shows an IOX interface 40 at the top surface 12 of the glass substrate.

Figure 2C:
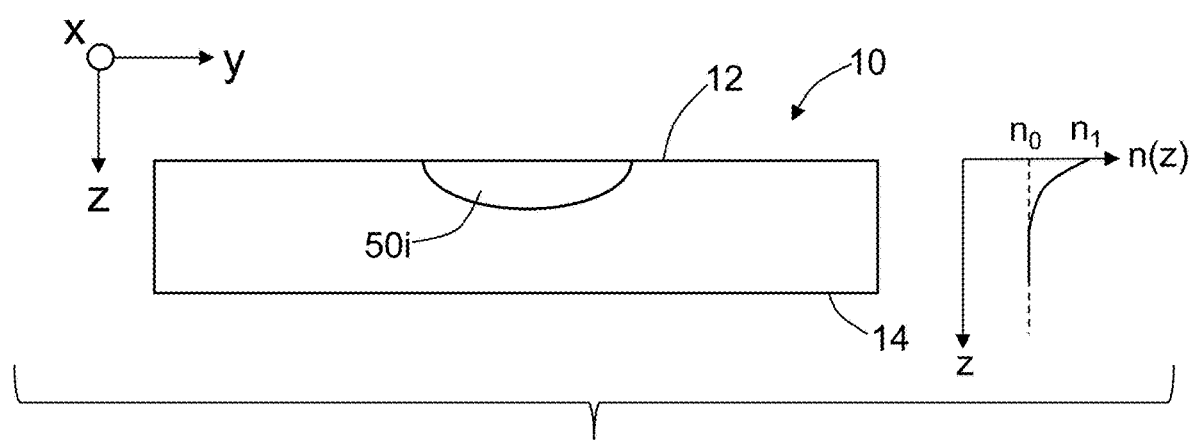

FIG. 2C shows the resulting Ag—Na IOX glass substrate 10, wherein the mask 20 has been removed and wherein the Ag—Na IOX process of the step 1 diffusion has created an initial Ag—Na IOX region 50i aligned with the previous location of the aperture 22 of the mask 20. The initial Ag—Na IOX region 50i has an initial refractive index profile n(z) that has a maximum value $n_1$ at the top surface 12 of the substrate (i.e., $n_s=n_1$) and that monotonically decreases with distance (depth) z into the glass substrate 10 until it reaches the bulk refractive index $n_0$. The (maximum) change in refractive index $\Delta n=n_1-n_0$.

Figure 2D:
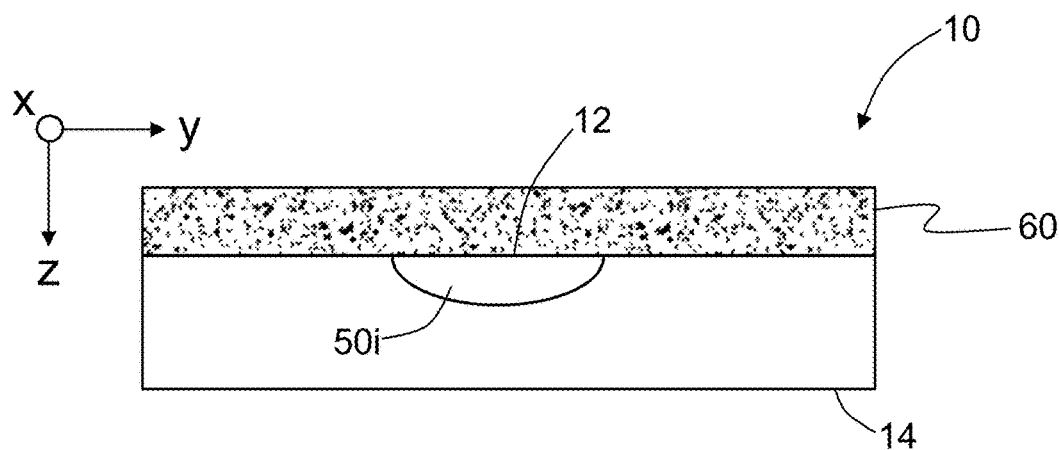

FIG. 2D shows the next step (i.e., a step 2 diffusion) in the IOX process, which includes providing a sodium salt bath 60 (e.g., $NaNO_3$) to the top surface 12 of the glass substrate 10 and in particular to the initial Ag—Na IOX region 50i to perform an Na—Ag IOX process. Example Na—Ag IOX parameters for this step include a diffusion temperature $T_D$ in the range from 250 C to 400 C, and a diffusion time $t_D$ in the range from 5 min to 46 h. In an example, this IOX process can be field assisted.

The step 2 diffusion employing the Na—Ag IOX process of FIG. 2D causes the $Ag^+$ ions close with the glass substrate 10 and close to the top surface 12 to exchange with the Na ions in the sodium salt bath 60. The result of this process is shown in FIG. 2E, wherein the initial Ag—Na IOX region 50i has been converted by the Na—Ag IOX process to a final Ag—Na IOX region 50 that is "buried," i.e., has a refractive index profile with its maximum value $n_1$ residing below the top surface 12.

In an example, the final Ag—Na IOX region 50 extends in the y-direction and defines a core of an Ag—Na IOX waveguide 100, which is also defined by a portion of the glass substrate 10 immediately surrounding the final Ag—Na IOX region 50. Thus, the Ag—Na IOX waveguide 100 has a graded refractive index profile n(y,z) with a maximum refractive index $n_1$ below the top surface 12 and a minimum refractive no at the depth of layer DL, while the top surface 12 has a refractive index $n_s<n_1$ and in example closer to the bulk refractive index $n_0$ than to the maximum refractive index $n_1$. The final Ag—Na IOX region 50 has a width WGY in the Y-direction.

Figure 2E:
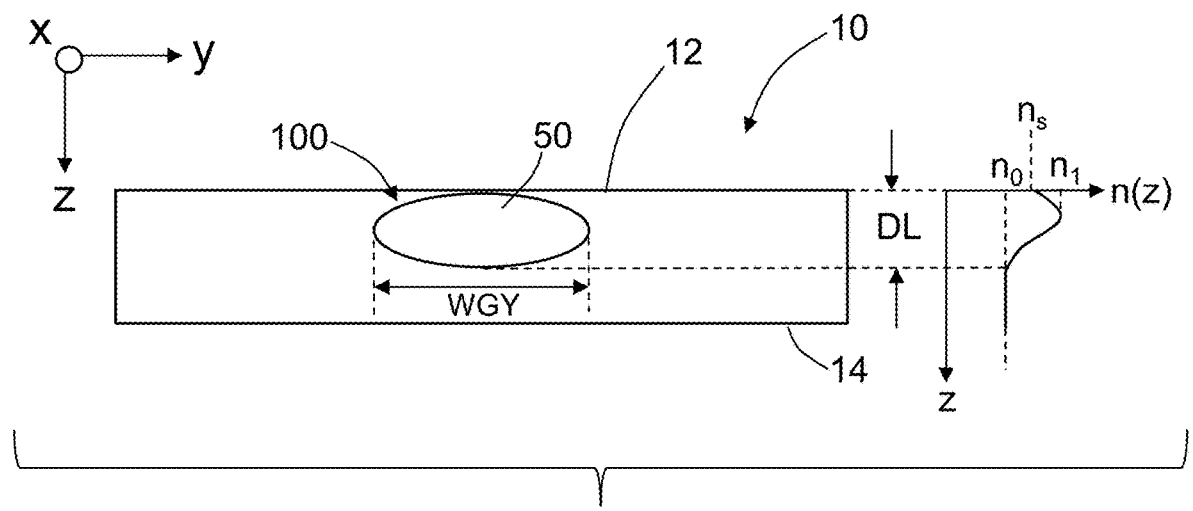
Figure 2F:
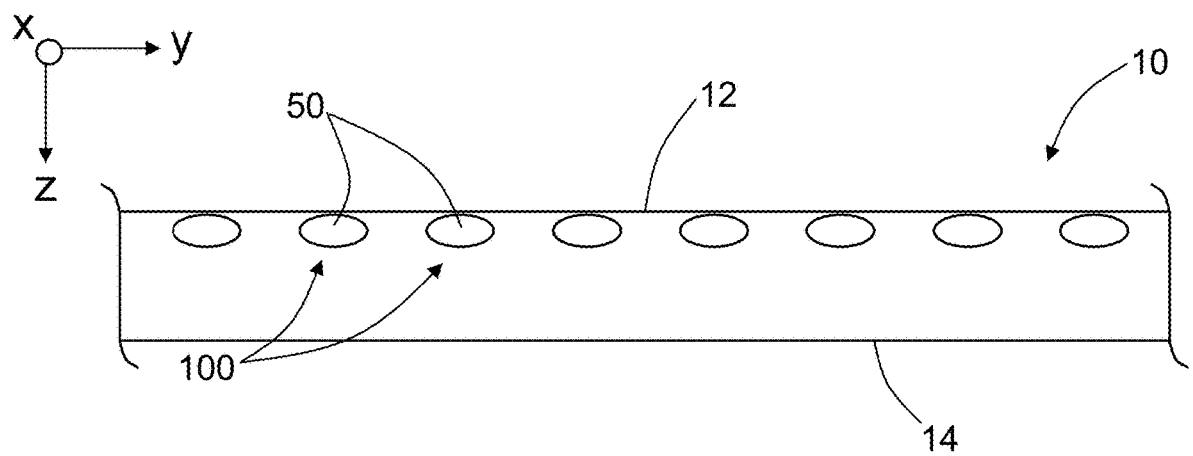
FIG. 2F is similar to FIG. 2E and illustrates an example where multiple Ag—Na IOX waveguides are formed in a single glass substrate.
Figure 2G:
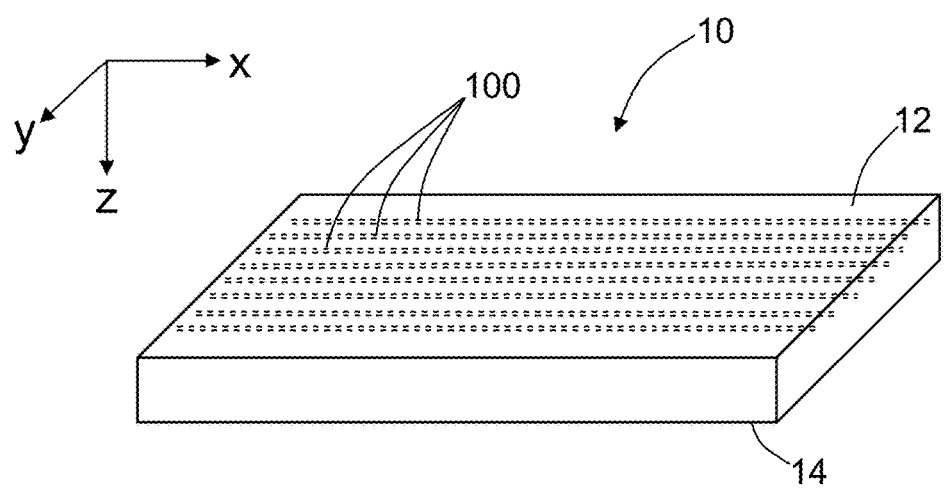
FIG. 2G is similar to FIG. 1 and shows the multiple Ag—Na IOX waveguides of FIG. 2F.

FIG. 2F is similar to FIG. 2E and illustrates an example glass substrate 10 that includes multiple Ag—Na IOX waveguides 100 formed in the glass substrate 10. FIG. 2G is a top-elevated view of the glass substrate 10 that includes the multiple IOX waveguides 100 as shown in FIG. 2F and that can be used to form an optical backplane or an optical-electrical backplane, such as discussed in greater detail below.

Figure 3A:
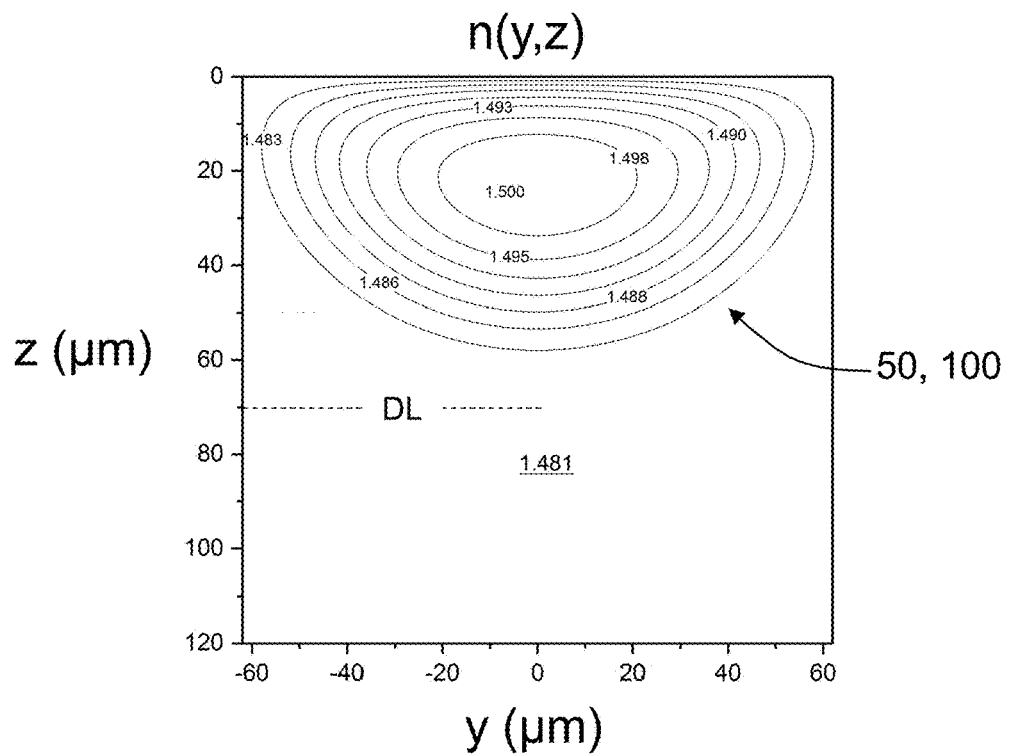
FIG. 3A is a cross-sectional view similar to FIG. 2E and shows example refractive index contours of the refractive index profile n(y,z) for a multimode Ag—Na IOX waveguide formed in an example glass based on computer simulation of the Ag—Na IOX process.

FIG. 3A is a cross-sectional view similar to FIG. 2E and shows example refractive index contours of the refractive index profile n(y,z) for a final IOX region 50 for a multimode IOX waveguide 100 formed in AAS-2 glass based on computer simulation of the Ag—Na IOX process. The simulation parameters included a mask aperture 22 having a width of 30 microns, a step 1 diffusion time $t_D$ of 12 h in a $AgNO_3$ salt bath with an Ag concentration $C_{Ag}=20$ wt %, and a step 2 diffusion time $t_D$ of 85 min in silver-free sodium salt bath ($NaNO_3$).

Figure 3B:
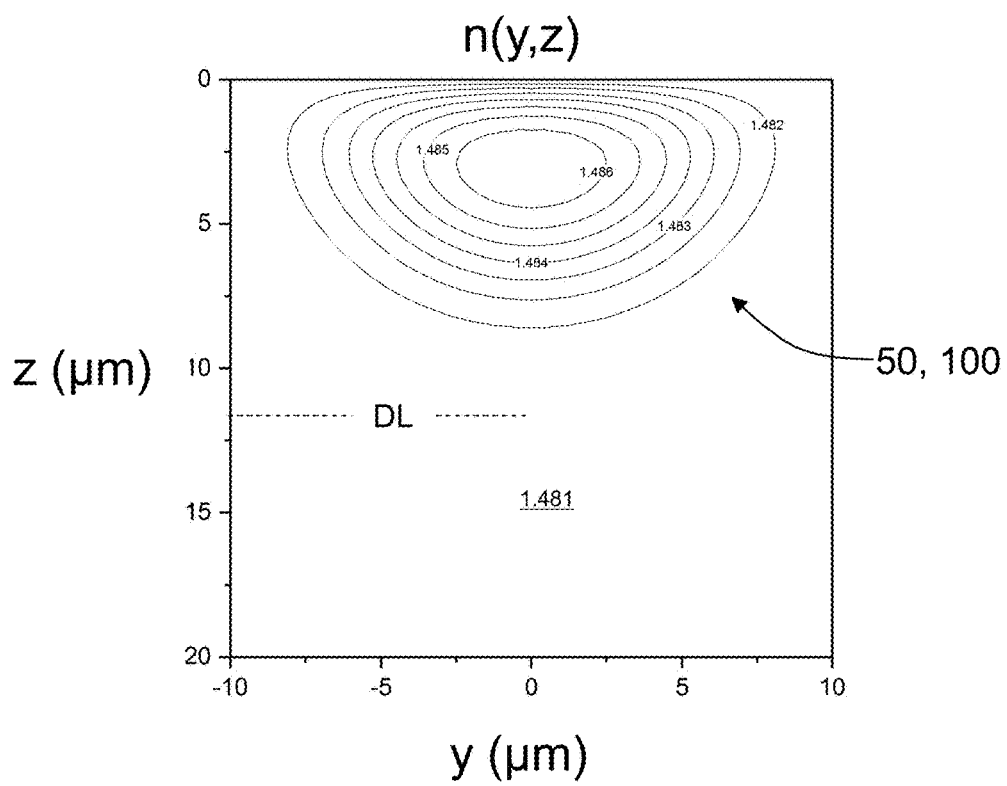
FIG. 3B is similar to FIG. 3A and is for an example single mode Ag—Na IOX waveguide.

FIG. 3B is similar to FIG. 3A and is for an example final IOX region 50 for a single mode IOX waveguide 100. The simulation parameters for the single mode IOX waveguide 100 included mask aperture 22 having a width of 3 microns, a step 1 diffusion time $t_D$ of 70 min in a $AgNO_3$ salt bath with a Ag concentration Cag=1 wt %, and a step 2 diffusion time $t_D$ of 17 min in silver-free salt bath ($NaNO_3$).

The change in refractive index $\Delta n=n_1-n_0$ for the final IOX region 50 of FIG. 3A is about $\Delta n=1.50-1.48=0.02$ for a depth of layer DL≈70 microns. The change in refractive index $\Delta n=n_1-n_0$ for the final IOX region 50 of FIG. 3B is about $\Delta n=1.486-1.481=0.005$ for a depth of layer DL≈12 microns. The values for the depth of layer DL can be more readily obtained from the contour plots of FIGS. 3A and 3B by using smaller refractive index intervals and using more contour lines. In an example, the depth of layer DL for the final IOX region 50 that defines a multimode IOX waveguide 100 can be up to 80 microns, while in other example the depth of layer DL for the final IOX region 50 that defines a single mode IOX waveguide can be up to 15 microns.

Figure 4A:
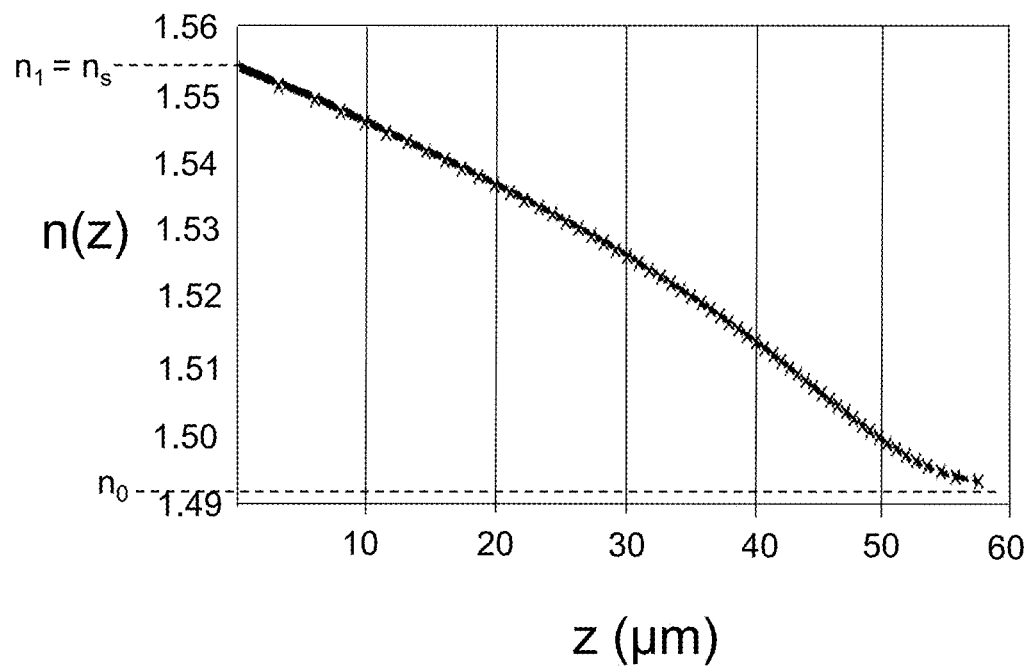
FIG. 4A is a plot of the interpolated measurements of the refractive index n(z) versus the depth coordinate z (μm) measured at a wavelength λ of 589 nm for an initial Ag—Na IOX region formed in an example high-transmission glass using an Ag—Na IOX process, wherein measurements were made for both the TE and TM modes, which essentially overlap.

FIG. 4A is a plot of interpolated measurements of the refractive index n(z) versus the depth coordinate z (µm) measured at a wavelength λ of 589 nm for an initial Ag—Na IOX region 50i formed in AAS-2 glass using the first part of the above-described Ag—Na IOX process that employed the following process parameters: no mask layer, a diffusion time $t_D$ of 4 h and an $AgNO_3$ salt bath having a silver concentration $C_{Ag}$ of 20 wt %.

The refractive index measurements were made for both the TE and TM modes (i.e., $n_{TE}$ and $n_{TM}$ were measured), but the difference between the two polarizations is not easily discerned in the plot of FIG. 4A because the two refractive index measurements essentially overlap, meaning that there is very little birefringence B in the Ag—Na IOX waveguide 100. In an example of the Ag—Na IOX waveguides 100 formed herein, the magnitude of the birefringence |B|≤0.001 within the IOX waveguide 100. i.e., at any point within the refractive index profile.

In the example of FIG. 4A, the maximum refractive index $n_1$ is about 1.555 while the bulk refractive index $n_0$ is about 1.495, so that the refractive index difference $\Delta n = n_1 - n_0 = 0.06$, with $n_1 = n_s$. The achievable refractive index change Δn for a corresponding Ag—Na IOX waveguide 100 made using a mask 20 is reduced due to the $Ag^+$ ions having to move through a limited mask aperture 22. The goal of the step 2 diffusion of the two-step IOX process is to move the maximum refractive index $n_1$ away from the surface 12 of the glass substrate 10 to achieve a substantially elliptical waveguide profile, such as shown in the simulated n(y,z) refractive index profiles of FIGS. 3A and 3B.

In an example, the step 2 diffusion using silver-free salt bath to exchange Na+ ions in the batch with Ag+ ions in the glass substrate 10 near the top surface 12 decreases the surface refractive index from $n_s = n_1$ to $n_s \approx n_0$. In various embodiments, the surface refractive index difference $\Delta n_s = n_s - n_0 \leq 0.002$ or ≤0.001 or ≤0.0005.

Figure 4B:
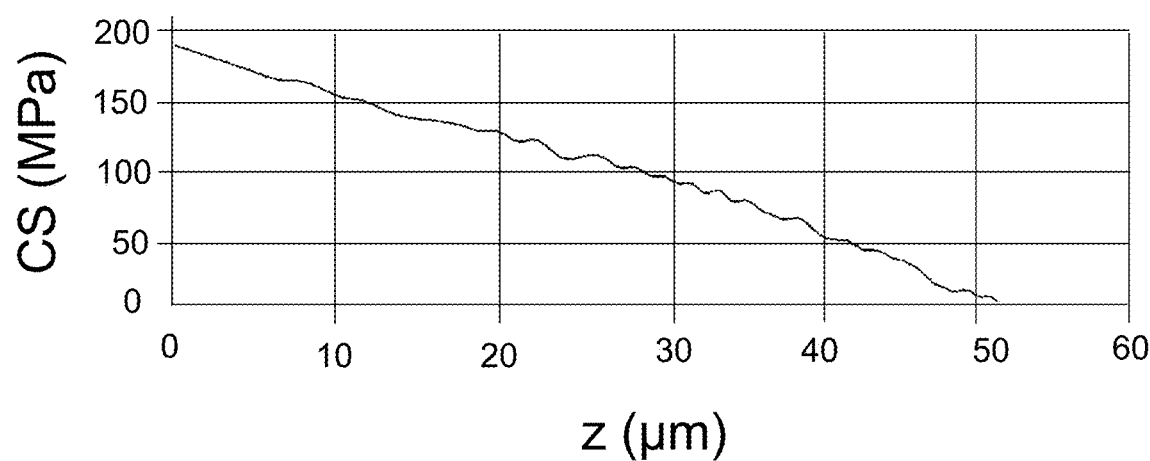
FIG. 4B is a plot of the measured compressive stress CS (MPa) versus the depth coordinate z (μnm) for the same initial Ag—Na IOX region of FIG. 4A.

FIG. 4B is a plot of the measured compressive stress CS (MPa) versus the depth coordinate z (µnm) for the same initial Ag—Na IOX region 50i of FIG. 4A. The maximum value of CS of about 170 MPa at the top surface 12 of the glass substrate 10 is relatively low and does not result in any substantial birefringence B within the IOX waveguide 100, which as noted above is reflected in the plot of FIG. 4A.

Figure 5:
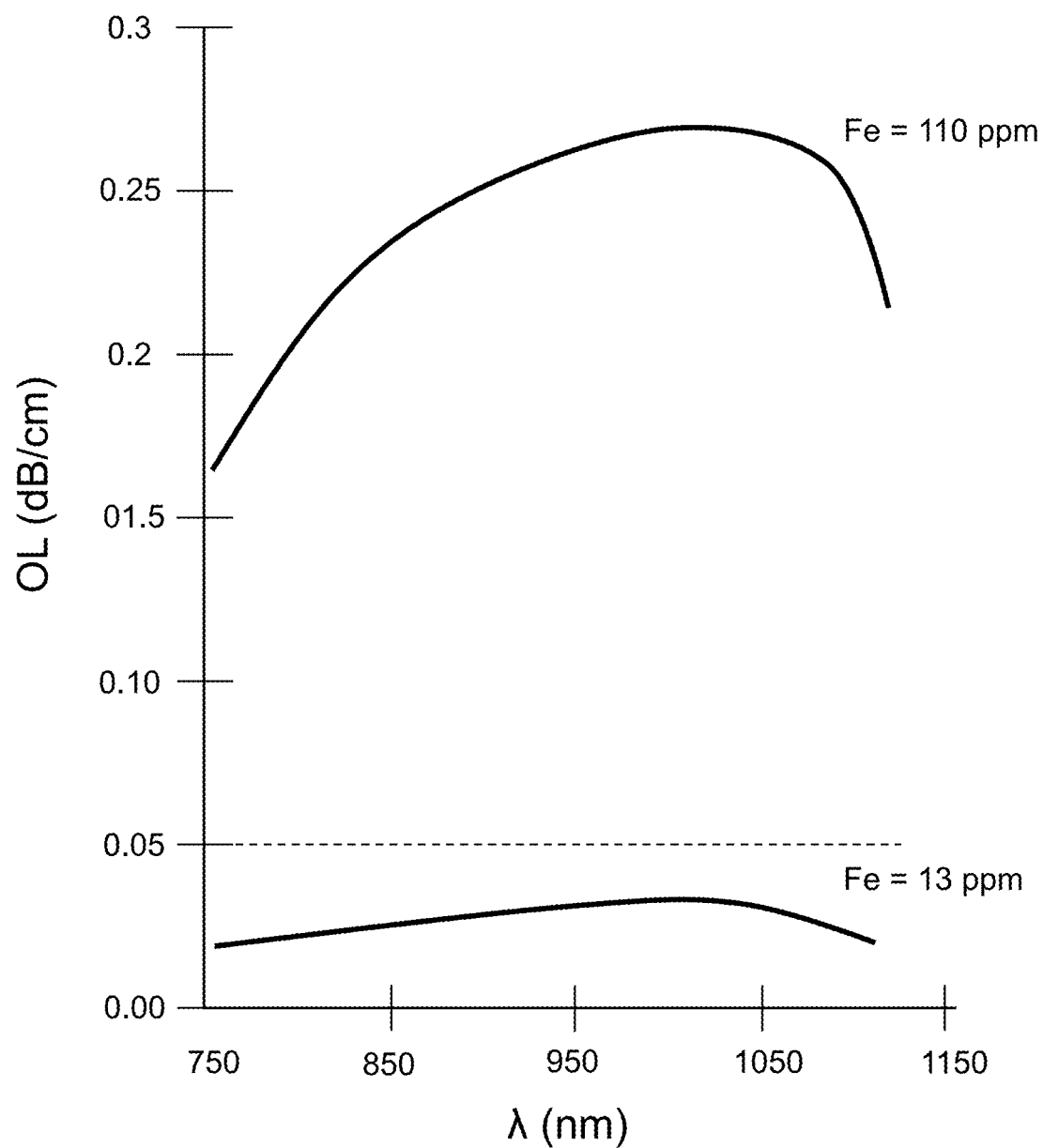
FIG. 5 is a plot of the bulk optical loss OL (dB/cm) as a function of wavelength λ (nm) for two different glasses, with one of the glasses having 110 ppm of Fe and the other glass having 13 ppm of Fe.

FIG. 5 is a plot of the bulk optical loss OL (dB/cm) as a function of wavelength λ (nm) for two example glasses having different iron (Fe) content (concentration). The first glass (top curve) has an Fe concentration of 110 ppm while the second glass is AAS-2 glass (bottom curve) having an Fe concentration of 13 ppm. The bulk optical loss OL<0.05 dB/cm for the AAS-2 glass indicates that the low-iron AAS glasses as described above are suitable for forming low-loss Ag—Na IOX waveguides 100.

Figure 6:
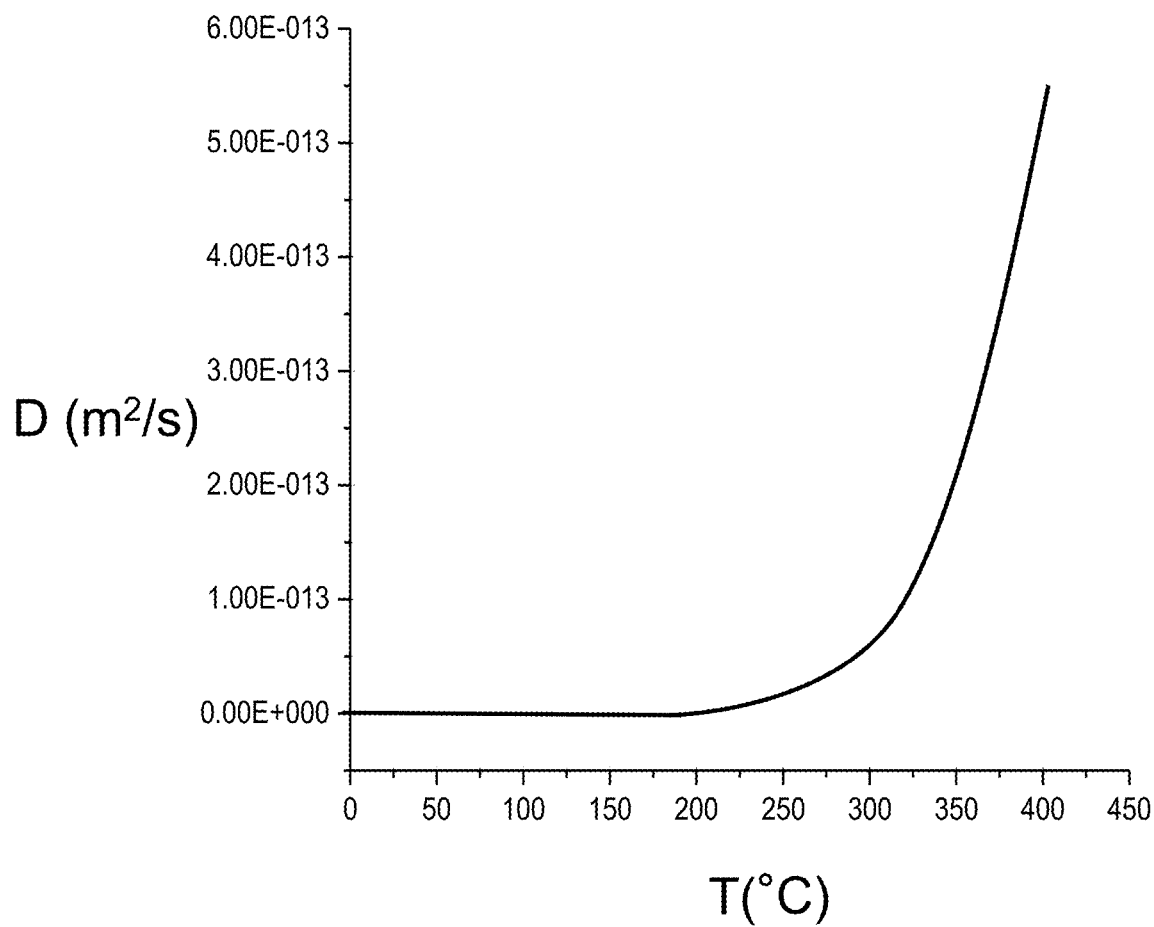
FIG. 6 is a plot of experimental measurements of the diffusivity D (m$^2$/s) for an Ag—Na IOX waveguide formed in an example high-transmission glass using an Ag—Na IOX process, which shows D=0 m$^2$/s at a target temperature of 100° C.

FIG. 6 is a plot based on experimental measurements of the diffusivity D ($m^2$/s) vs temperature T (° C.) for an IOX waveguide formed in an AAS-2 glass substrate using the above-described Ag—Na IOX process. The plot shows that D=0 at a target temperature of 100° C. The diffusivity D of AAS-2 glass is between $D = 0.5 \times 10^{-13}$ $m^2$/s and $D = 2 \times 10^{-13}$ $m^2$/s for process temperatures T between 250° C. and 400° C. Glass compositions with relatively low diffusivity D are preferred for applications with operation temperatures of up to 100° C. to avoid ongoing diffusion of the IOX waveguide during its operating lifetime. The plot of FIG. 6 shows that the AAS-2 glass has a diffusivity D=0 at 100° C., which Represents a Reasonable upper limit on environmental conditions to which the Ag—Na IOX waveguides 100 could be exposed when deployed in an optical or optical-electrical system.

Example Backplane with IOX Waveguides

Figure 7A:
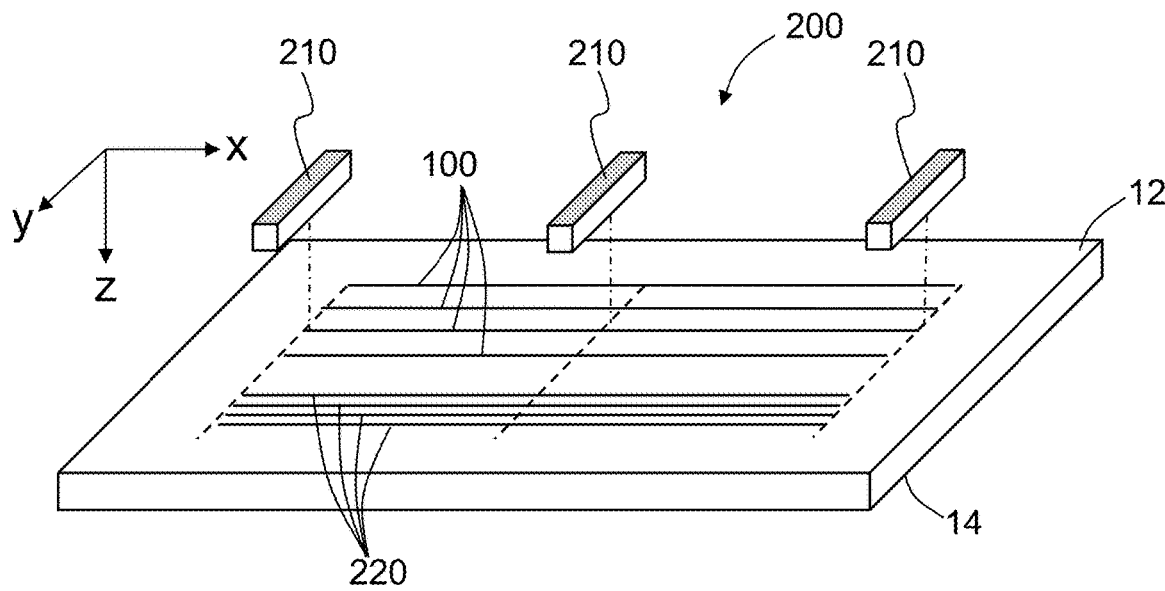
FIG. 7A is a top elevated view of an example backplane that includes Ag—Na IOX waveguides, and also shows in a partially exploded view example optical couplers used to extract light from the Ag—Na IOX waveguides.

FIG. 7A is a top elevated view of an example backplane 200. The backplane 200 includes Ag—Na IOX waveguides 100 formed in the glass substrate 10 using the IOX process disclosed herein and using an AAS glass material for the glass substrate, as described above. FIG. 7A also shows (in a partially exploded view) example optical couplers 210 used to extract light from the Ag—Na IOX waveguides 100 to form optical interconnections when operably disposed relative to the Ag—Na IOX waveguides. In an example, the optical couplers 210 operate using evanescent optical coupling and are configured to receive an optical connector of a device having optical functionality, as described below.

The backplane 200 can also include electrical conductors 220 used to form electrical interconnections. Thus, the example backplane 200 can include an optical data bus defined by the array of Ag—Na IOX waveguides 100 for high-speed data transmission of optical signals OS and an electrical bus defined by the electrical conductor 220 for slower-speed electrical signals ES, which can include both data and electrical power. Such a backplane 200 can be referred to as an O-E backplane. A backplane 200 that includes the optical functionality can be referred to as an optical backplane.

Example System Employing the Backplane

Figure 7B:
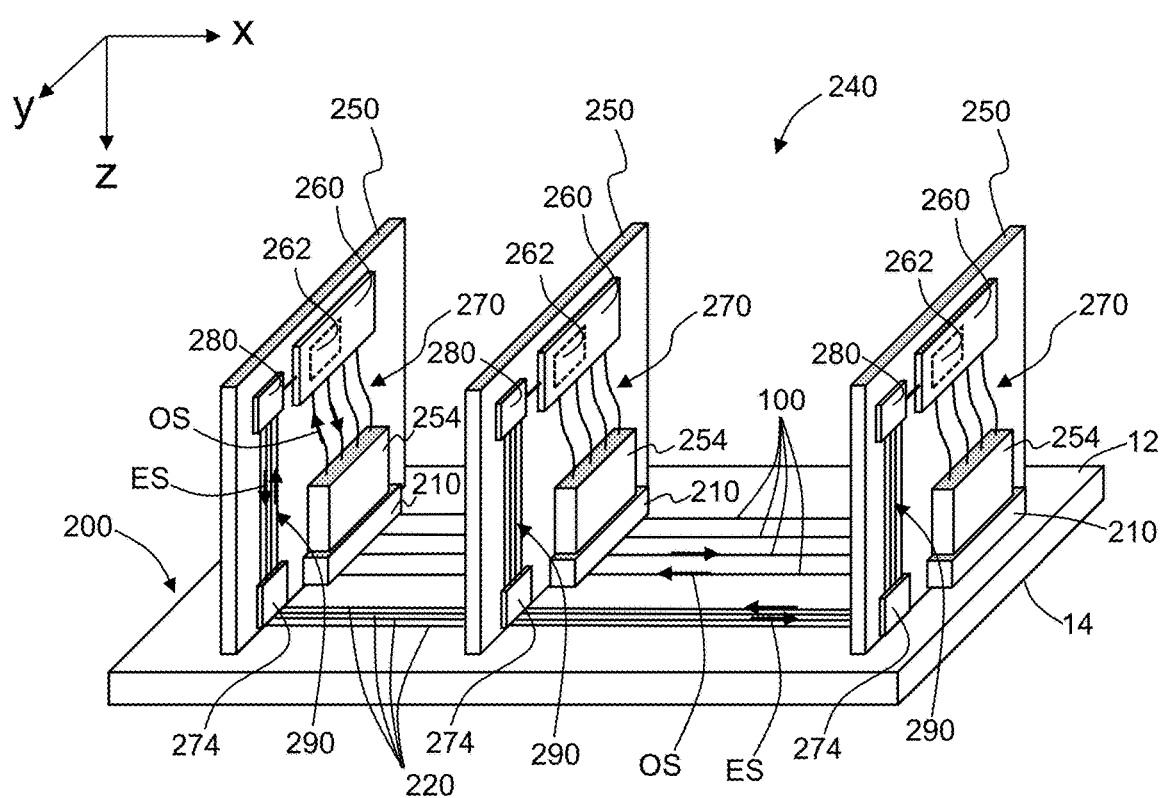
FIG. 7B is a top elevated view of an example optical-electrical system that includes the backplane and optical couplers of FIG. 7A, along with example optical-electrical devices in the form of line cards operably coupled to the Ag—Na IOX waveguides of the backplane via the optical couplers.

FIG. 7B is a top elevated view of an example system 240 that includes the backplane 200 and optical couplers 210 of FIG. 7A. The example system 240 can have optical or optical and electrical functionality. The example system 240 includes devices 250 optically coupled to the Ag—Na IOX waveguides via respective optical couplers 210. The devices 250 are shown by way of example in the form of line cards. The devices 250 can have optical or optical and electrical functionality, and are described below as having both optical and electrical functionality (i.e., as O-E devices) by way of illustration.

Each device 250 includes by way of example an optical connector 254 that optically connects the device to the optical coupler 210. In an example, the optical connector 254 and optical coupler 210 are configured to form a pluggable connection to facilitate installation of the devices 250 into the backplane 200.

Each device 250 can include a module 260 that has an optical engine 262 (e.g., an optical transceiver). Each device 250 also can include an array of optical waveguides (e.g., optical fibers) 270 that optically couple the optical connector 254 to the optical engine 262 of the module 260.

Each device 250 can also include an electrical connector 274, an integrated circuit (IC) chip 280 and an array of electrical wires 290 that electrically connect the electrical connector 274 to the IC chip 280.

Thus, in an example, the devices 250 are in optical communication via the optical bus defined by the IOX waveguides 100 and are in electrical communication via the electrical bus defined by the electrical conductors 220. The optical bus carries the optical signals OS (e.g., optical data signals), while the electrical bus carries the electrical signals ES, which as noted above can be electrical data signals as well as power (e.g., DC power).

The backplane 200 can be used for data center or high-performance applications where the optical link can be relatively long, e.g., up to about 2 meters (m). An example Ag—Na IOX waveguide 100 of length 2 m with an optical loss OL=0.01 dB/cm has an overall optical loss of 2 dB, which is considered the maximum allowable amount of optical loss for a practical optical backplane application. Consequently, example Ag—Na IOX waveguides 100 disclosed herein can have an optical loss OL≤0.01 dB/cm. In other examples where the distance of the optical link is not so large (e.g., 0.4 m), an optical loss OL≤0.05 dB/cm may be acceptable.

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. A method of forming an ion-exchanged (IOX) waveguide in a substrate, comprising:
   a) forming a mask on a top surface of the substrate, the mask defining at least one opening to the top surface, wherein the substrate comprises an alkali-aluminosilicate glass including Na and having a concentration of Fe equal to 50 parts per million (ppm) or less;
   b) performing a first IOX process by providing a silver salt bath atop the top surface of the substrate and the mask, wherein, during the first IOX process, Ag+ ions exchange with Na+ ions from the top surface of the substrate through the at least one opening in the mask so as to form an initial IOX region having a maximum refractive index at the top surface of the substrate; and
   c) performing a second IOX process by providing a sodium salt bath atop the top surface of the substrate, wherein, during the second IOX process, Na+ ions exchange with Ag+ ions from the initial IOX region of the top surface of the substrate to form from the initial IOX region a buried IOX region having a maximum refractive index below the top surface of the substrate, the buried IOX region and a surrounding portion of the substrate defining an IOX waveguide having an optical loss OL≤0.05 dB/cm and a birefringence magnitude |B|≤0.001, wherein the second IOX process is an Na—Ag IOX process.

2. The method according to claim 1, wherein the optical loss OL≤0.01 dB/cm.

3. The method according to claim 2, wherein the Fe concentration is less than 15 ppm.

4. The method according to claim 3, wherein the Fe concentration is less than 10 ppm.

5. The method according to claim 1, wherein the alkali-aluminosilicate glass contains Ni and Cr in amounts of 1 ppm or less.

6. The method according to claim 1, wherein the buried IOX region has a depth of layer between 45 and 80 microns and a refractive index difference Δn in the range from 0.01≤Δn≤0.06.

7. The method according to claim 1, wherein the buried IOX region has a depth of layer between 6 and 15 microns and a maximum refractive index difference Δn in the range from 0.002≤Δn≤0.01.

8. The method according to claim 1, wherein the substrate has a bulk refractive index n0, the buried IOX region has a surface refractive index ns at the top surface of the substrate, and wherein a surface refractive index difference $\Delta n_s = n_s - n_0 \leq 0.001$.

9. The method according to claim 1, wherein the buried IOX region has a diffusivity D=0 m²/s at a temperature of 100° C.

10. The method according to claim 1, wherein the first IOX process is field assisted.

11. The method according to claim 1, further comprising optically coupling a device with optical functionality to the IOX waveguide.

12. A substrate with an ion-exchanged (IOX) waveguide formed by a process comprising:
    a) forming a mask on a top surface of the substrate, the mask defining at least one opening to the top surface, wherein the substrate comprises an alkali-aluminosilicate glass including Na and having a concentration of Fe equal to 50 parts per million (ppm) or less;
    b) performing a first IOX process by providing a silver salt bath atop the top surface of the substrate and the mask, wherein, during the first IOX process, Ag+ ions exchange with Na+ ions from the top surface of the substrate through the at least one opening in the mask so as to form an initial IOX region having a maximum refractive index at the top surface of the substrate; and
    c) performing a second IOX process by providing a sodium salt bath atop the top surface of the substrate, wherein, during the second IOX process, Na+ ions exchange with Ag+ ions from the initial IOX region of the top surface of the substrate to form from the initial IOX region a buried IOX region having a maximum refractive index below the top surface of the substrate, the buried IOX region and a surrounding portion of the substrate defining an IOX waveguide having an optical loss OL≤0.05 dB/cm and a birefringence magnitude |B|≤0.001, wherein the second IOX process is an Na—Ag IOX process.

13. The substrate formed by the process according to claim 12, wherein the optical loss OL≤0.01 dB/cm.

14. The substrate formed by the process according to claim 13, wherein the Fe concentration is less than 15 ppm.

15. The substrate formed by the process according to claim 14, wherein the Fe concentration is less than 10 ppm.

16. The substrate formed by the process according to claim 12, wherein the alkali-aluminosilicate glass contains Ni and Cr in amounts of 1 ppm or less.

17. The substrate formed by the process according to claim 12, wherein the buried IOX region has a depth of layer between 45 and 80 microns and a refractive index difference Δn in the range from 0.01≤Δn≤0.06.

18. The substrate formed by the process according to claim 12, wherein the buried IOX region has a depth of layer between 6 and 15 microns and a maximum refractive index difference Δn in the range from 0.002≤Δn≤0.01.

19. The substrate formed by the process according to claim 12, wherein the substrate has a bulk refractive index n0, the buried IOX region has a surface refractive index ns at the top surface of the substrate, and wherein a surface refractive index difference $\Delta n_s = n_s - n_0 \leq 0.001$.

20. The substrate formed by the process according to claim 12, wherein the buried IOX region has a diffusivity D=0 m²/s at a temperature of 100° C.

21. The substrate formed by the process according to claim 12, wherein the first IOX process is field assisted.

22. A device optically coupled with a substrate with an ion-exchanged (IOX) waveguide formed by a process comprising:
    a) forming a mask on a top surface of the substrate, the mask defining at least one opening to the top surface, wherein the substrate comprises an alkali-aluminosilicate glass including Na and having a concentration of Fe equal to 50 parts per million (ppm) or less;

b) performing a first IOX process by providing a silver salt bath atop the top surface of the substrate and the mask, wherein, during the first IOX process, Ag+ ions exchange with Na+ ions from the top surface of the substrate through the at least one opening in the mask so as to form an initial IOX region having a maximum refractive index at the top surface of the substrate;

c) performing a second IOX process by providing a sodium salt bath atop the top surface of the substrate, wherein, during the second IOX process, Na+ ions exchange with Ag+ ions from the initial IOX region of the top surface of the substrate to form from the initial IOX region a buried IOX region having a maximum refractive index below the top surface of the substrate, the buried IOX region and a surrounding portion of the substrate defining an IOX waveguide having an optical loss $OL \leq 0.05$ dB/cm and a birefringence magnitude $|B| \leq 0.001$, wherein the second IOX process is an Na—Ag IOX process; and d) optically coupling the IOX waveguide with a remainder of the device.

* * * * *